Feb. 13, 1962 D. R. KIRK ET AL 3,020,986
COMPOSITE STRUCTURAL PANEL
Filed Aug. 18, 1958 3 Sheets-Sheet 1
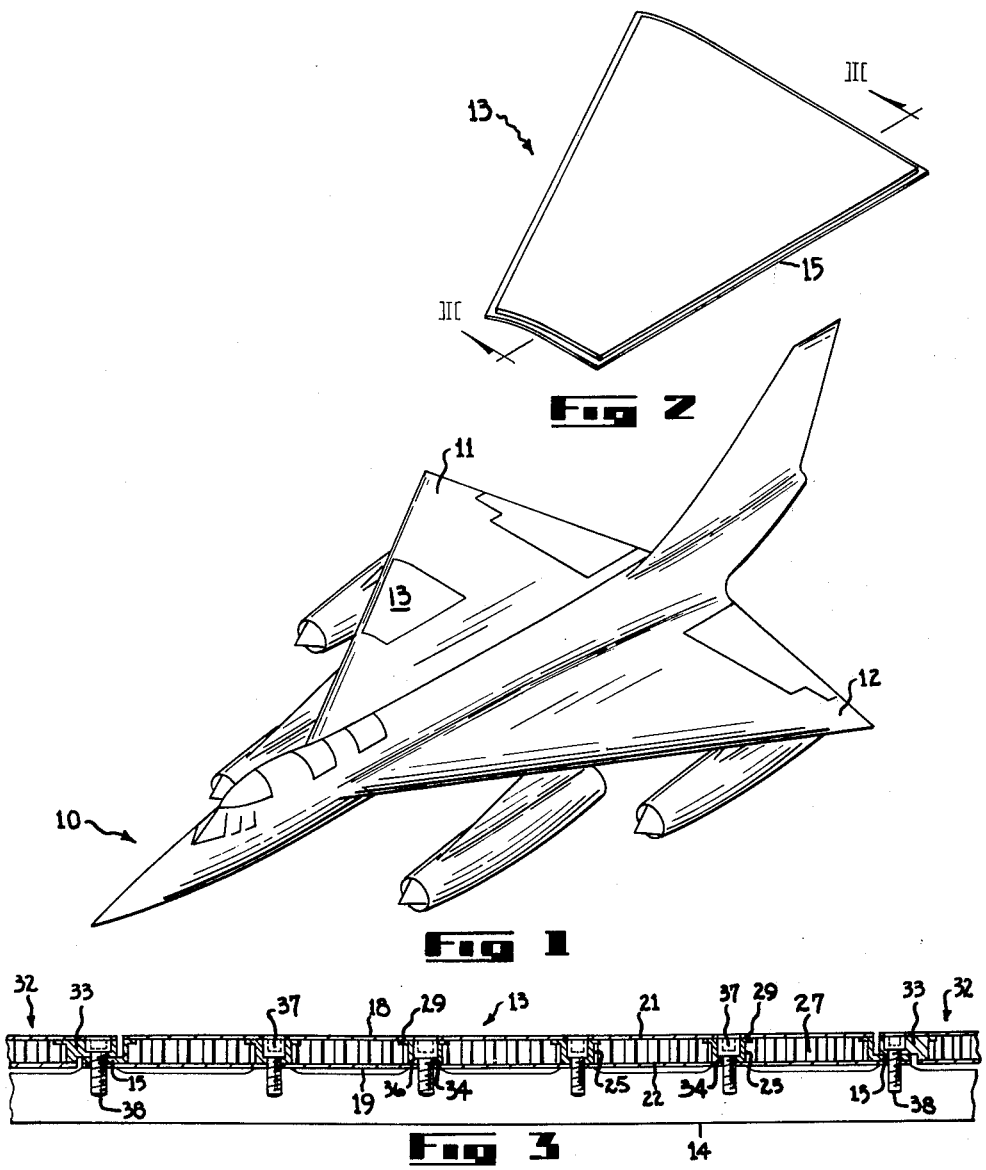
INVENTORS
DONALD R. KIRK
LARZ M. SMITH
BY

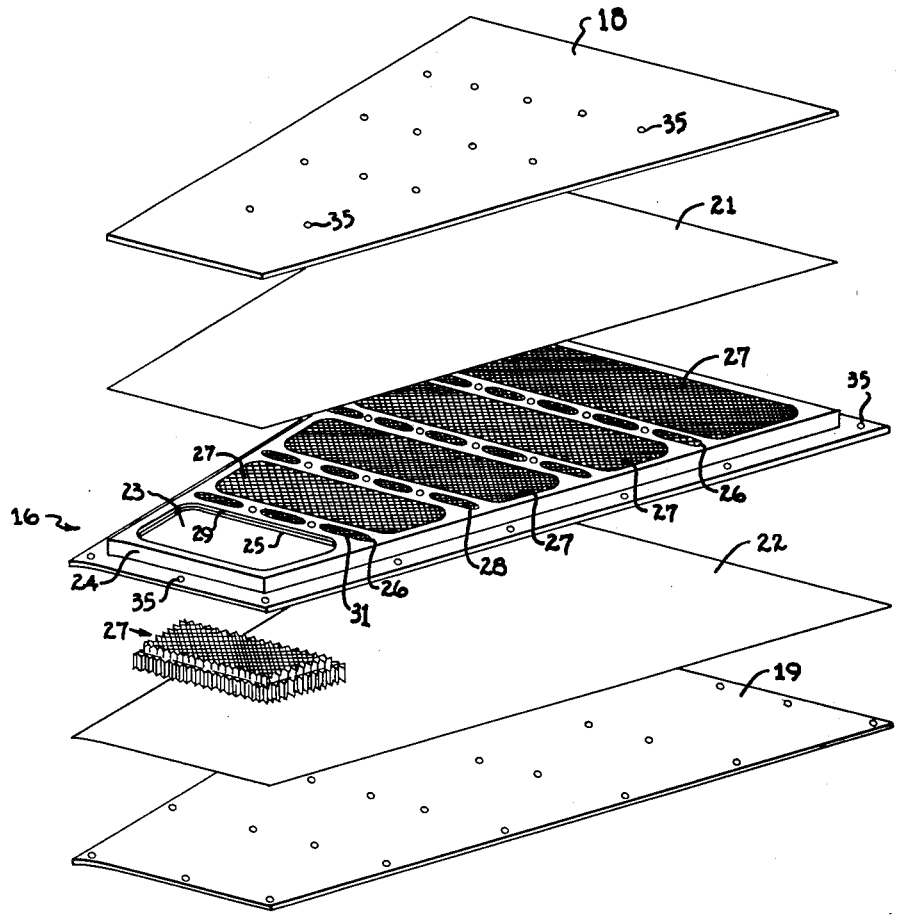

Feb. 13, 1962 D. R. KIRK ET AL 3,020,986
COMPOSITE STRUCTURAL PANEL
Filed Aug. 18, 1958 3 Sheets-Sheet 3

INVENTORS
DONALD R. KIRK
LARZ M. SMITH
BY

United States Patent Office 3,020,986
Patented Feb. 13, 1962

3,020,986
COMPOSITE STRUCTURAL PANEL
Donald R. Kirk and Larz M. Smith, Fort Worth, Tex., assignors to General Dynamics Corporation, San Diego, Calif., a corporation of Delaware
Filed Aug. 18, 1958, Ser. No. 755,505
3 Claims. (Cl. 189—34)

The present invention relates generally to composite structural members and more particularly to a novel construction embodying cellular core, bonded to various other structural elements to form a composite panel adapted to be used as a primary structural component in the building of aircraft, missiles, space craft and the like.

With the advent of modern, high performance aircraft and missiles, especially those of supersonic capability, many new and heretofore non-existent problems have arisen. Not the least of these is that of providing new structural components which are lightweight, yet which will withstand the stress and strain that aerodynamic loading and heating impose upon them during supersonic flight. It has, therefore, become necessary to provide structures which have a very high strength/weight ratio, exceptional heat resistance characteristics, excellent fatigue resistant qualities when subjected to high frequency vibrations and/or high energy sound, such as jet engine noise, and which resist buckling tendencies under elevated temperatures and pressures.

It has been determined that the above requirements are most satisfactorily fulfilled by a class of cellular cored, bonded, sandwich panels. Such panels typically consist of a cellular type core, the individual cells of which have a hexagonal, square, or other suitable configuration and generally resemble a honeycomb, disposed within a restraining framework serving to strengthen the panel at attachment points or other areas of high stress, which elements are positioned between two sheets of thin gauge facing material and adhesively bonded thereto. Such panel thus provides a structure having the above mentioned physical characteristics, with structural integrity in all environments to which present aircraft and missiles of supersonic capability are subjected.

Heretofore aircraft structures of comparable function have consisted of a rather complex framework comprised of the elements of spars, bulkheads, doublers, trusses, angles, clips, etc. about which was conformably attached a sheet or skin of relatively heavy gauge metal to which was riveted a plurality of stiffeners or stringers to add strength and rigidity to said skin.

Several disadvantages are inherent in such a composite structure. It has a comparatively low strength/weight ratio; it provides little or no insulation; and due to the large number of detail parts, most of which are attached by rivets or small bolts, its fatigue value is undesirably low. Further disadvantages reside in the fact that such a structure is easily buckled; is difficult to manufacture and install, and it provides no satisfactory means for sealing an integrated fuel tank which may be defined and enclosed thereby.

It is therefore an object of the present invention to provide an improved composite structure having an exceptionally high strength/weight ratio.

Another object of the present invention is to provide a structure having improved insulating characteristics.

A further object is the provision of an improved structure which is particularly adapted to resist the deleterious effects of high frequency mechanical vibrations and high energy sonic vibrations.

A still further object is to provide a structure having an improved construction which particularly adapts it to resist buckling tendencies when subjected to elevated temperatures and pressures.

Yet another object of the present invention resides in the provision of an improved structure which, due to its homogeneous construction, has a high load-carrying capacity and capability, which is equal in all directions.

Still another object of the invention is the provision of a structure having a high strength/weight ratio and exceptional insulating characteristics, yet is of simple construction.

These and other objects and advantages will be apparent to those skilled in the art from the following description of the appended drawings wherein:

FIGURE 1 is a perspective view of a jet bomber on one wing of which there has been outlined a typical wing panel which is constructed in accordance with the present invention.

FIGURE 2 is an enlarged illustration of the typical wing panel of FIGURE 1.

FIGURE 3 is a sectional view of the wing panel taken along line III—III of FIGURE 2;

FIGURE 4 is an exploded view of the composite panel showing its component elements in detail.

Figure 5:
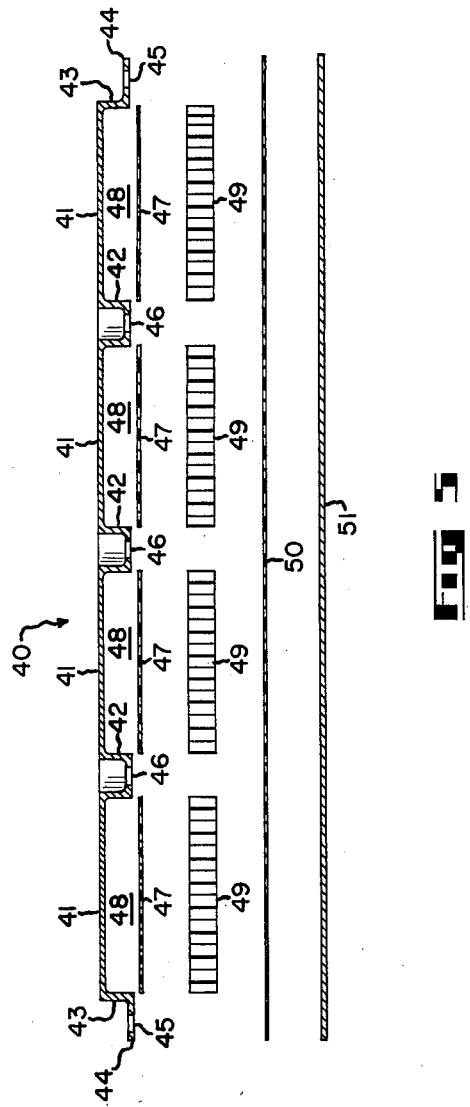
FIGURE 5 is another embodiment of the present invention illustrated in an exploded cross-sectional view.

Referring now with particularity to the drawings there is shown in FIGURE 1 an airplane 10 having laterally extending, generally triangularly shaped wings 11 and 12. It will be understood that these wings embody suitable structure for securement to the fuselage of the airplane and are provided with suitable ailerons at their trailing edges mounted for pivotal movement in conventional manner.

The present invention is concerned with the construction of a composite cellular cored panel one of the principal uses of which is as a component in the covering or skin of an airplane wing. It is assumed that the upper and lower surfaces or skins of wings 11 and 12 of airplane 10 embody a plurality of the present panels and for purposes of illustration one of the panels, constructed in accordance with the present invention, has been outlined on wing 11 and is indicated generally by the numeral 13.

Though typical panel 13 is shown as being of generally trapezoidal configuration, it is understood that this configuration is not limiting but that the panels composing the coverings of wings 11 and 12 will be of appropriate configurations to permit interfitting therebetween and that as many panels will be employed as are required to form the desired wing coverings. The internal structure of the wings to which the composite panels are attached form no part of the invention and, accordingly, will not be described and the details thereof will not be shown other than as generally illustrated at 14 in FIGURE 3.

FIGURE 2 illustrates more clearly the configuration of typical panel 13 and shows that this panel embodies a peripheral, laterally extending, flange 15, which serves as the mating medium of panel 13 with other adjacent panels comprising the wing covering.

FIGURES 3 and 4 illustrate the components of composite panel 13. Panel 13, as shown, comprises the combination of an integral frame 16, an outer facing sheet 18, an inner facing sheet 19 and two layers 21 and 22 of adhesive material, and a plurality of suitably shaped cellular core modules to fill cavities or openings, to be described, in frame 16.

Integral frame 16 is fabricated from a solid plate of metal, such as aluminum alloy, being suitably first formed to the desired contour. Thereafter the flange 15 and a plurality of through openings 23 are formed by removal of portions of the solid plate as by machining or by chemical milling. Openings or cavities 23 are all essentially of the same outline, here shown as generally trapezoidal, and are arranged the length of the plate. As a result of this operation, there is effected a continuous peripheral wall 24, and a plurality of internal transverse wall portions 25 separating the openings 23. As shown, a plurality of oblong cavities or openings 26 are also provided, as by machining or chemical milling, at spaced intervals along the transverse walls 25.

Cavities 23 and 26 receive and are filled by, respectively, core elements 27 and 28 conforming in shape to that of the cavities into which they are fitted.

Providing cutouts in rigid frame 16, as above described, and filling them with modular core material serves to effect a substantial decrease in the weight of the panel 13 without materially detracting from its structural characteristics. It is apparent that the outer edges or ends of the honeycomb core elements 27 and 28 which lie in the planes of the opposite faces of frame 16 serve to increase the area of bonding surface provided for adhering of the sheets 18 and 19 to frame 16.

In the fabrication of frame 16 there is formed at the entrance to each of the openings 23 an inwardly extending, peripheral flange 29 which projects into a suitable indentation in the side of its associated core element 27 and acts to prevent the core element 27 from buckling outer skin 18 as a result of a combination of increased internal pressure and decreased external pressure due to aerodynamic flow. Similar flanges 31 are afforded the oblong cavities 26 for the same purpose.

Frame 16, as described, includes the peripheral flange 15 which allows for mating of panel 13 with other adjacent panels 32, which other panels include suitably located cooperating flanges 33 which overlap flange 15.

It is apparent from the description herein provided that frame 16 functions to add rigidity to panel 13, to facilitate the mating of said panel with contiguous panels 32 and to prevent buckling of outer skin 18 by the core sections.

Outer and inner facing sheets 18 and 19 preferably are made of a suitable high strength aluminum alloy of relatively thin gauge, which may be in the order of .032 to .064, with outer skin 18 closing the upper entrances of cavities 23 and 26 and being of a configuration and size conforming to peripheral wall 24 to which it is adhered. Outer skin 18 endows panel 13 with an external, aerodynamically smooth surface under all flight conditions, in addition to carrying a substantial portion of the structural loading. Inner skin 19 is of sufficient size to close the opposite ends of cavities 23 and 26 and serves to provide an internal seal for core elements 27 and 28 and also carries a substantial portion of the structural loads, as may be imposed on the composite panel.

Cellular core elements 27 and 28 are fabricated of commercially available metal, plastic or resin impregnated fiber glass material, being suitably cut into required shapes. When core elements of plastic or fiber glass are bonded between the facing sheets 18 and 19 there is formed an inert or "dead" air space which endows the panel with exceptionally good insulating characteristics. In the event that heat transfer, rather than insulation, is desired, the core elements are made of a metal, such as aluminum, rather than fiber glass or plastic. The resulting structure then becomes a very effective heat transfer medium. The provision of these core elements 27 and 28 between facing shets 18 and 19 also greatly increases the structural rigidity and nonbuckling characteristics of panel 13.

The bonding together of the above described component parts is accomplished by means of the layers 21 and 22 of a high-strength, heat and pressure sensitive adhesive material which is provided in sheet form conforming in size and outline to the outer and inner skins 18 and 19. Adhesive layers 21 and 22, in addition to bonding the component parts together to form a highly efficient composite structure, also greatly increases the fatigue resistant qualities of the panel 13 by providing a dampening or cushioning effect, when panel 13 is subjected to vibrations resulting from aerodynamic forces or high energy sound, and thus substantially eliminates the deleterious effects of such vibrations. The particular composition of the adhesive used forms no part of the present invention as this invention contemplates the use of any suitable commercially available adhesive.

After the various components of the panel 13 have been bonded together into a composite unit a plurality of openings 34 are drilled, at predetermined attach points 35, through outer skin 18, transverse walls 25 and inner skin 19, and through flange 15 and inner skin 19. These openings 34 are then counterbored, as indicated at 36, to accept internal wrenching, high strength bolts 37 which serve as the means for the attachment of the panel 13 to the internal framing structure of the wing, a portion of which is shown at 14 in FIGURE 3. Wing frame 14 is provided with suitably threaded holes which align with openings 34 of the panel for acceptance of the bolts 37. The diameter and depth of the counterbores 36 and the size of bolts 37 are such that when bolts 37 are fully threaded into wing frame 14 their heads are completely disposed within the counterbores.

After panel 13 has been secured in place the adjacent panels 32 are arranged in position and secured in like manner to wing frame 14 by other bolts 38. A suitable sealant may then be applied about the bolts 37 and at the mating line of panels 13 and 32 to form a fuel tight seal. A suitable filler material may also be applied within counterbores 36 above the heads of bolts 37 and 38 and within such other crevices as are present for the purpose of restoring the aerodynamic shape and surface of panel 13.

In the modified form of the invention shown in FIGURE 5 the outer skin 18 and frame 16 of the preferred modification of FIGURE 4 are replaced by the single integrated panel component 40. Component 40 is fabricated from a solid metal plate. Such plate is first formed to the desired peripheral outline; then portions of the plate are removed by suitable conventional means, such as machining or chemical milling, leaving relatively thin webs 41 between internally positioned transverse reinforcing wall members 42 and peripheral wall members 43. Thin webs 41 combine to form an outer skin surface which is the equivalent of outer skin 18 of the preferred embodiment. Thus, component 40 serves the dual function of internal frame 16 and outer skin 18. Peripheral wall members 43 are provided with outwardly projecting step flanges 44 through which are drilled apertures 45 for mating with other similar and cooperating panel structures (not shown) in a manner described above. Transverse reinforcing wall members are provided with counterbored apertures 46 for the acceptance of internal wrenching bolts (not shown) for attachment purposes.

After component 40 has been formed, suitable adhesive material 47, which may be in sheet form, is placed in cavities 48 separating transverse walls 42 of component 40. Next honeycomb core sections 49 conforming to the shape of cavities 48 are positioned in cavities 48 to substantially fill such cavities. Adhesive sheet 50 and inner facing sheet 51 are then properly located and the assembly operation is complete. These components are then bonded by a suitable method, thus yielding a composite panel having very exceptional structural and insulating characteristics.

As herein described, the present invention is characterized as a novel structural composite comprising, in combination, a plurality of modular cellular core elements, an integral frame having a plurality of cavities suitably adapted to contain the core elements, and a pair of facing sheets disposed one on either side of said core and the frame and bonded thereto to form a composite structure which is particularly adapted to be employed as an external wing covering panel component on supersonic aircraft, missiles and space craft.

While the preferred embodiments of the present invention have been disclosed, it is understood that the invention is not limited thereto, as many variations will be readily apparent to those skilled in the art and the invention is to be given its broadest interpretation within the terms of the following claims.

We claim:

1. A composite structural panel comprising a rigid, internal frame member having a peripheral wall and having a plurality of through openings within the area bounded by said peripheral wall, an integral peripheral continuous attachment flange extending laterally from said peripheral wall, a plurality of transverse wall portions separating said openings, said transverse wall portions having a plurality of spaced through openings therealong, a cellular core element disposed in each of said first mentioned plurality of openings and said second mentioned plurality of openings and having a shape conforming to the shape of its opening and filling such opening, and a thin metallic surface sheet positioned at each of the opposite faces of said frame member extending thereover to cover the opposite ends of said openings, each of said surface sheets being adhesively bonded in place to said frame member and said cellular core elements.

2. A composite structural panel suitable for use in aircraft construction comprising a rigid, internal frame member having a peripheral continuous wall corresponding in outline to the outline of the finished panel and having a plurality of through openings extending across the area defined by said wall, an integral peripheral continuous attachment flange extending laterally from said peripheral continuous wall, a plurality of spaced transverse wall portions integral with said peripheral continuous wall separating said openings, said transverse wall portions having a plurality of through spaced openings therealong, a cellular core element disposed in each of said first mentioned plurality of openings and said second mentioned plurality of openings and having a shape conforming to the shape of its opening and filling such opening, and a thin metallic surface sheet positioned at each of the opposite faces of said frame member extending thereover to cover the opposite ends of said openings, each of said surface sheets being adhesively bonded in place to said frame member and said cellular core elements.

3. A composite structural panel suitable for use in aircraft construction comprising a rigid, internal frame member having a peripheral continuous wall corresponding in outline to the outline of the finished panel and having a plurality of through openings extending across the area defined by said wall, an integral peripheral continuous attachment flange extending laterally from said peripheral continuous wall, a plurality of spaced transverse wall portions integral with said peripheral continuous wall separating said openings, said transverse wall portions having a plurality of through spaced openings therealong, a cellular core element disposed in each of said first mentioned plurality of openings and said second mentioned plurality of openings and having a shape conforming to the shape of its associated opening and filling such opening, an integral inwardly directed flange provided on said wall and wall portions at the entrance, in the outer face of the frame, of each of said first mentioned plurality of openings and said second mentioned plurality of openings, said inwardly directed flanges engaging with and acting to prevent movement of their associated cellular core elements outwardly of their openings in the direction of said outer face of the frame, and a thin metallic surface sheet positioned at each of the opposite faces of said frame member extending thereover to cover the opposite ends of said openings, each of said surface sheets being adhesively bonded in place to said frame member and said cellular core elements.

References Cited in the file of this patent

UNITED STATES PATENTS

| | | |
|---|---|---|
| 1,232,905 | Estler | July 10, 1917 |
| 2,199,938 | Kloote | May 7, 1940 |
| 2,220,596 | Bernhardt | Nov. 5, 1940 |
| 2,234,517 | Coffman | Mar. 11, 1941 |
| 2,291,614 | Fay | Aug. 4, 1942 |
| 2,682,089 | Stahl | June 29, 1954 |
| 2,778,766 | Kloote et al. | Jan. 22, 1957 |

FOREIGN PATENTS

| | | |
|---|---|---|
| 452,943 | Great Britain | Sept. 2, 1936 |